US008991659B2

(12) United States Patent  
Dey et al.

(10) Patent No.: US 8,991,659 B2  
(45) Date of Patent: Mar. 31, 2015

(54) COMPARTMENTALIZED LAUNDRY CADDY FOR DISPENSING DOSED VOLUMES

(71) Applicants: John Dey, El Cerrito, CA (US); Jacob Gano, El Sobrante, CA (US)

(72) Inventors: John Dey, El Cerrito, CA (US); Jacob Gano, El Sobrante, CA (US)

( * ) Notice: Subject to any disclaimer, the term of this patent is extended or adjusted under 35 U.S.C. 154(b) by 80 days.

(21) Appl. No.: 13/909,405

(22) Filed: Jun. 4, 2013

(65) Prior Publication Data

US 2014/0061236 A1  Mar. 6, 2014

Related U.S. Application Data

(60) Provisional application No. 61/695,000, filed on Aug. 30, 2012.

(51) Int. Cl.
| | | |
|---|---|---|
| *B65D 37/00* | (2006.01) | |
| *B65D 21/02* | (2006.01) | |
| *G01F 11/08* | (2006.01) | |

(52) U.S. Cl.  
CPC .......... *B65D 21/0201* (2013.01); *G01F 11/082* (2013.01)  
USPC ............................. 222/207; 222/132; 222/143

(58) Field of Classification Search  
CPC ............... B65D 21/02; B65D 21/0201; B65D 21/0237; A47K 5/1201; A47K 5/1202; A47K 5/122; B67D 7/0216; G01F 11/082; G01F 11/286; G01F 11/288  
USPC ........ 222/23, 129, 132, 142.3, 143, 206, 207, 222/211, 323, 464.1, 192, 205, 465.1, 158; 206/223; 220/23.83, 23.88, 4.26, 4.27  
See application file for complete search history.

(56) References Cited

U.S. PATENT DOCUMENTS

| 516,938 A | * | 3/1894 | Meyer .............................. 99/367 |
|---|---|---|---|
| 3,194,426 A | * | 7/1965 | Brown, Jr. ..................... 220/23.4 |
| 3,347,420 A | * | 10/1967 | Donoghue .................... 222/129 |
| 3,876,112 A | * | 4/1975 | Kramer .......................... 222/132 |
| 4,106,673 A | * | 8/1978 | Donoghue .................... 222/207 |
| 4,219,136 A | | 8/1980 | Williams et al. |
| 4,678,103 A | | 7/1987 | Dirksing |
| 4,835,804 A | | 6/1989 | Arnau-Munoz et al. |
| 4,874,107 A | | 10/1989 | Arnau-Munoz et al. |
| 5,330,081 A | * | 7/1994 | Davenport .................... 222/207 |
| 6,472,360 B1 | | 10/2002 | Beggs et al. |
| 7,594,594 B2 | | 9/2009 | Troost et al. |
| 8,651,271 B1 | * | 2/2014 | Shen ............................. 206/216 |
| D703,403 S | * | 4/2014 | Dey et al. ....................... D32/35 |
| 2006/0157506 A1 | * | 7/2006 | Durant .......................... 222/143 |

(Continued)

*Primary Examiner* — Patrick M Buechner  
(74) *Attorney, Agent, or Firm* — Buckingham Doolittle & Burroughs, LLC

(57) ABSTRACT

A laundry caddy device is disclosed that provides a precise way of measuring an amount of laundry solvent, and offers several inter-lockable containers that form one easy to carry bottle. Typically, there are four containers which are interlocked together to form the single component. The device comprises at least one container, a base component, and a dispensing component. The container further comprises an interior cavity for retaining an amount of laundry solvent. The base component is removably secured to the bottom end and the dispensing component is removably secured to the top end. The lid and handle are removably secured to the top end, over the dispensing component. Additionally, at least one of the containers comprises a measuring cup for a dispensing component. Further, at least one of the containers comprises a pour spout, a retaining cup, and a vacuum tube for dispensing the contents of the container.

17 Claims, 5 Drawing Sheets

(56) References Cited

U.S. PATENT DOCUMENTS

| | | | |
|---|---|---|---|
| 2008/0047862 A1* | 2/2008 | Caporrino | 206/436 |
| 2009/0001076 A1* | 1/2009 | Wagner | 220/23.88 |
| 2010/0308133 A1* | 12/2010 | Yeh | 239/327 |
| 2011/0204051 A1* | 8/2011 | Pawl | 220/23.83 |
| 2014/0061236 A1* | 3/2014 | Dey et al. | 222/129 |

\* cited by examiner

COMPARTMENTALIZED LAUNDRY CADDY FOR DISPENSING DOSED VOLUMES

CROSS-REFERENCE

This application claims priority from Provisional Patent Application Ser. No. 61/695,000 filed Aug. 30, 2012.

BACKGROUND

When doing the laundry, there are certain supplies that are needed. Furthermore, if a washing and/or drying machine is not in a convenient location, a user needs to carry all their supplies and products with them along with their dirty laundry, which can be a very cumbersome task. Additionally, utilizing the laundry measuring cups which are provided on top of a liquid laundry detergent bottle can be messy and inefficient. An effective solution to prevent these problems is necessary.

The laundry caddy device provides an easy and precise way of measuring the amount of detergent, softener, etc. for one or multiple laundry loads, and offers a portable solution for users that do not have convenient access to a washing and/or drying machine. The laundry caddy device also creates a practical solution when a user needs multiple containers of various laundry products or supplies, and eliminates messy laundry cups that have to be placed back on the original container, along with any spillage that might occur.

SUMMARY

The following presents a simplified summary in order to provide a basic understanding of some aspects of the disclosed innovation. This summary is not an extensive overview, and it is not intended to identify key/critical elements or to delineate the scope thereof. Its sole purpose is to present some concepts in a simplified form as a prelude to the more detailed description that is presented later.

The subject matter disclosed and claimed herein, in one aspect thereof, comprises a laundry caddy device that provides an easy and precise way of measuring an amount of laundry detergent, softener, etc., and offers several inter-lockable containers that form one easy to carry container. The laundry caddy device comprises at least one container, a base component, and a dispensing component. Typically, the container further comprises an interior cavity for retaining a predetermined amount of laundry detergent, softener, etc. The base component is removably secured to the bottom end of the containers. Additionally, the dispensing component is removably secured to the top end of the containers to prevent spilling of the laundry solvent from within the cavity. The laundry caddy device further comprises a lid and a handle removably secured to the top end of the container, over the dispensing component.

In a preferred embodiment, there are a plurality of containers which are inter-locked together to form a single component. The base component is then removably secured to the bottom end of the inter-locked single component. Typically, there are four containers which are each a generally triangular prism in shape with slightly radiused exterior surfaces. The four containers are inter-locked together such that the vertex opposite the radius of each container, contact each other to form a generally cylindrical structure. Additionally, at least one of the containers comprises a measuring cup for a dispensing component. Further, at least one of the containers comprises a pour spout, a retaining cup, and a vacuum tube in fluid communication with the retaining cup for dispensing the contents of the container.

To the accomplishment of the foregoing and related ends, certain illustrative aspects of the disclosed innovation are described herein in connection with the following description and the annexed drawings. These aspects are indicative, however, of but a few of the various ways in which the principles disclosed herein can be employed and is intended to include all such aspects and their equivalents. Other advantages and novel features will become apparent from the following detailed description when considered in conjunction with the drawings.

DESCRIPTION OF PREFERRED EMBODIMENTS

Figure 1:
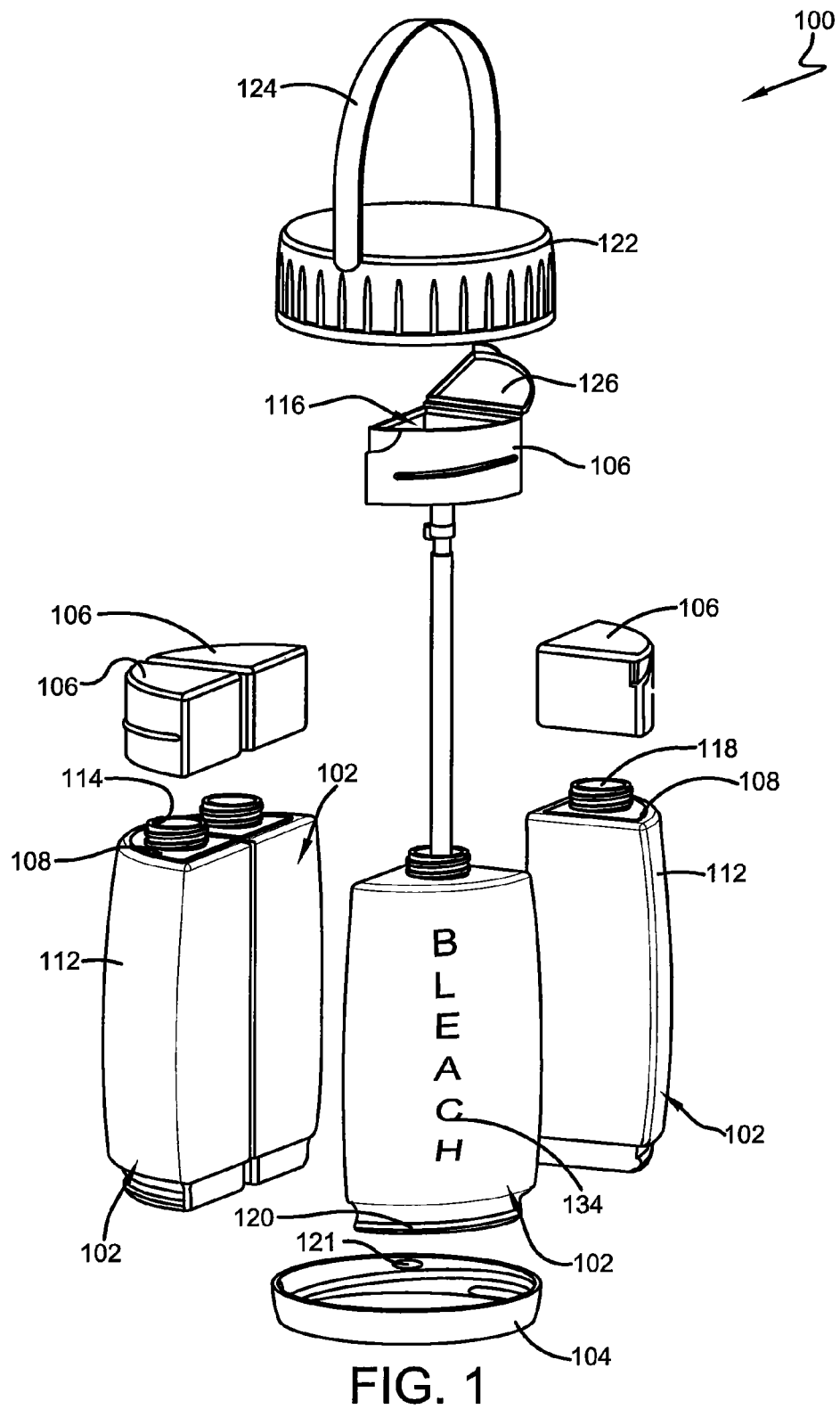
FIG. 1 illustrates an exploded perspective view of the laundry caddy device in accordance with the disclosed architecture.

The innovation is now described with reference to the drawings, wherein like reference numerals are used to refer to like elements throughout. In the following description, for purposes of explanation, numerous specific details are set forth in order to provide a thorough understanding thereof. It may be evident, however, that the innovation can be practiced without these specific details. In other instances, well-known structures and devices are shown in block diagram form in order to facilitate a description thereof.

The present invention provides an easy and precise way of measuring the amount of solvent for one or multiple laundry loads, and offers a portable solution for users that do not have convenient access to a washing and/or drying machine. The laundry caddy device also creates a practical solution when a user needs multiple containers of various laundry products or supplies, and eliminates messy laundry cups that have to be placed back on the original container, along with any spillage that might occur.

The laundry caddy device discloses several inter-lockable containers that form one easy to carry bottle. Typically, there are four containers which are inter-locked together to form a single device or container. The laundry caddy device comprises at least one container, a base component, and a dispensing component. The container further comprises an interior cavity for retaining an amount of laundry solvent. The base component is removably secured to the bottom end and the dispensing component is removably secured to the top end. The lid and handle are removably secured to the top end, over the dispensing component. Additionally, at least one of the containers comprises a measuring cup for a dispensing component. Further, at least one of the containers comprises a pour spout, a retaining cup, and a vacuum tube for dispensing the contents of the container.

Referring initially to the drawings, FIG. 1 illustrates the laundry caddy device 100 that provides an easy and precise way of measuring an amount of laundry solvent, and offers several inter-lockable containers that form one easy to carry device. The laundry caddy device 100 comprises at least one container 102, a base component 104, and a dispensing component 106. In a preferred embodiment of the present invention, device 100 comprises four containers 102.

Each container 102 comprises a top end 108, a bottom end 110, an exterior surface 112, and an interior surface 114. Typically, the container 102 is generally a triangular prism in shape, however any other suitable shape can be used as is known in the art without affecting the overall concept of the invention. The container 102 would generally be constructed of polyvinyl chloride (PVC), acrylonitrile butadiene styrene (ABS), or any other similar polymer, etc., though any other suitable material may be used to manufacture the container 102 as is known in the art without affecting the overall concept of the invention. The container 102 can also comprise a variety of colors and designs to suit user and manufacturing preference. The container 102 is approximately between 8 and 9 inches long as measured from the top end 108 to the bottom end 110, and contains a radius of approximately between 2 and 4 inches from the center to the tangent of the arc.

Typically, the container 102 further comprises an interior cavity 116 for retaining a predetermined amount of laundry solvent (not shown) or other solvent. The laundry solvent can be any suitable type of laundry solvent, dry or liquid, as is known in the art, such as laundry detergent, fabric softener, bleach, stain remover solution, etc. The laundry solvent is typically poured through an opening 118 at the top end 108 of the container 102 and a dispensing component 106 is removably secured to the top end 108, over the opening 118 to prevent spilling of the laundry solvent from within the cavity 116.

Figure 2:
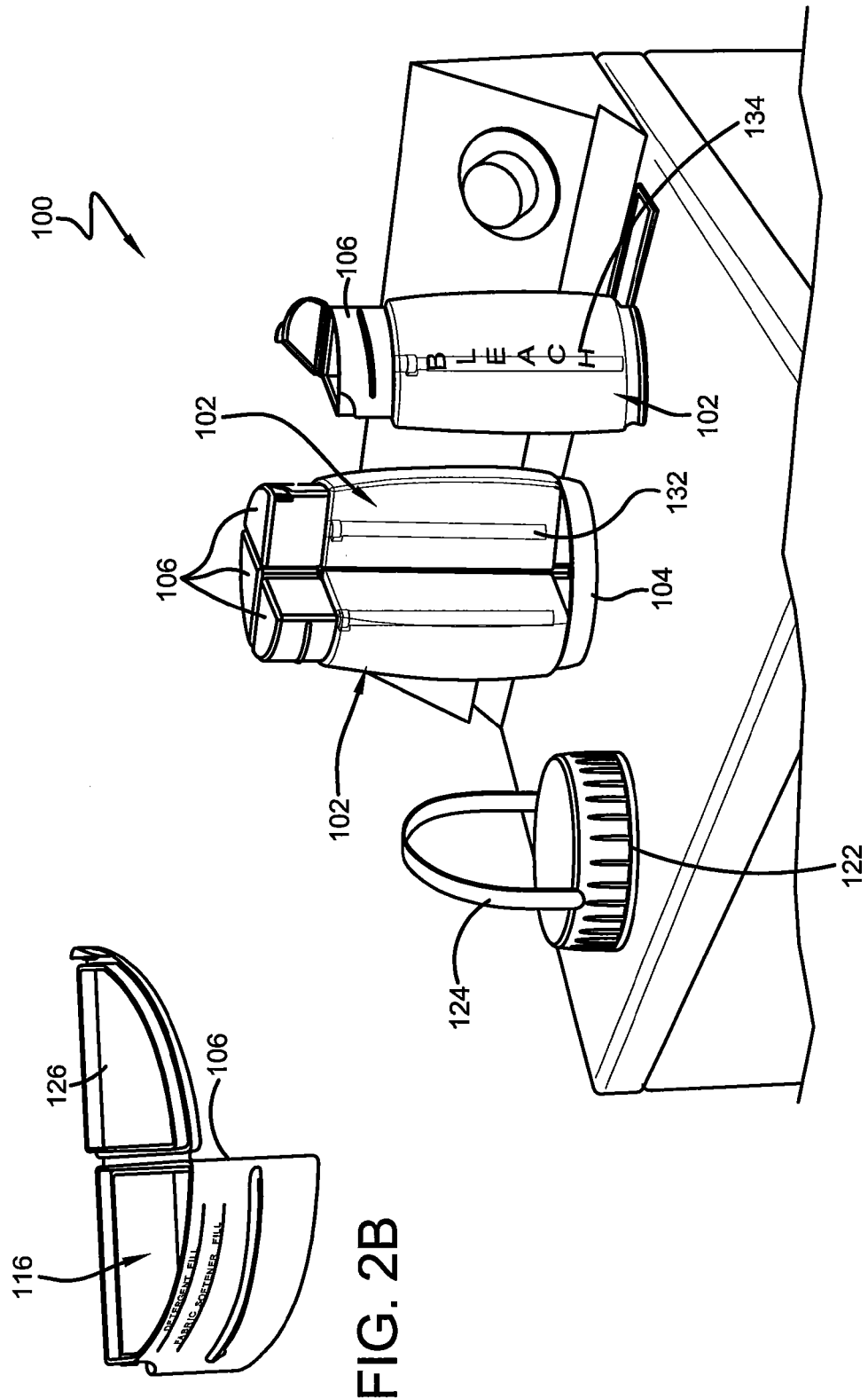
FIG. 2A illustrates a perspective view of the laundry caddy device with one of the containers removed in accordance with the disclosed architecture.
FIG. 2B illustrates a perspective view of the measuring cup of the laundry caddy device in accordance with the disclosed architecture.

The laundry caddy device 100 further comprises a base component 104 removably secured to the bottom end 110 of the container 102. In a preferred embodiment, there are a plurality of containers 102 which are inter-locked together to form a single component (as shown in FIG. 2). The base component 104 is then removably secured to the bottom end of the inter-locked single component (i.e. the plurality of containers 102 inter-locked together). Typically, there are four containers 102 which are each a generally triangular prism in shape with slightly radiused exterior surfaces. The four containers 102 are inter-locked together such that the vertex opposite the radius of each container 102, contacts each adjacent container 102 to form a generally cylindrical structure (i.e., similar to pie wedges). However, four containers 102 are not necessary and any suitable number of containers 102 can be used without affecting the overall concept of the invention. The containers 102 are then secured together via the base component 104 which is secured to the bottom end of the containers 102 via a snap feature 120, press-fit, or any other suitable securing means as is known in the art.

The laundry caddy device 100 further comprises a lid 122 removably secured to the top end 108 of the container 102, over the dispensing component 106. The lid 122, as the base component 104 does, would secure the plurality of containers 102 together to form a single component. The lid 122 would typically snap on or twist on over all four containers, or can be secured via any other suitable means as is known in the art. Additionally, if the lid 122 twists on, the top radius of each of the containers 102 would be partially threaded. Further, the lid 122 can comprise a handle 124 to allow a user to easily transport the laundry caddy device 100. The handle 124 can be any typical handle known in the art that allows the user to transport the device 100.

Additionally, the laundry caddy device 100 comprises a dispensing component 106 removably secured to the top end 108 of each of the containers 102. Specifically, the dispensing component 106 is secured over the opening 118 of each of the containers 102 to prevent spilling of the laundry solvent from within the cavity 116. The dispensing component 106 can be any suitable dispensing means as is known in the art, such as pour spouts, vacuum tubes, measuring cups, etc., and each container 102 can have a different dispensing component 106 depending on the type of laundry solvent contained within the cavity 116. In a preferred embodiment, at least one of the containers 102 comprises a measuring cup 126 for a dispensing component 106. The measuring cup 126 would be inverted and secured to the top end 108 of the container, securing the contents of the containers 102. A user would then remove the measuring cup 126 and pour the desired amount of laundry solvent from the container 102 into the measuring cup 126. The measuring cup 126 would typically be used with dry laundry solvents, but can be used with any suitable laundry solvents as is known in the art.

In another preferred embodiment, at least one of the containers 102 comprises a pour spout 128, a retaining cup 130, and a vacuum tube 132 in fluid communication with the retaining cup 130 for dispensing the contents of the container 102. The vacuum tube 132 would be inserted into the cavity 116 and would extend up into the retaining cup 130, such that a user would squeeze the container 102 to draw a desired amount of laundry solvent up through the vacuum tube 132 and into the retaining cup 130. Once the desired amount of laundry solvent is drawn up into the retaining cup 130, the user can then release the container 102 and pour the laundry solvent out of the retaining cup 130 via the pour spout 128 without dispensing the rest of the laundry solvent remaining in the cavity 116. The pour spout 128, retaining cup 130, and vacuum tube 132 would typically be used with liquid laundry solvents, but can be used with any suitable laundry solvents as is known in the art.

The laundry caddy device 100 can further comprise a side compartment (not shown) removably secured to at least one of the containers 102 for storing laundry supplies. The side compartment can be secured via any suitable securing means as is known in the art, and can be any suitable shape or size as is known in the art, depending on the wants and needs of a user. For example, the side compartment can house fabric softener sheets, stain sticks, spray bottles, etc., or any other suitable laundry supplies.

Further, the laundry caddy device 100 can comprise a label 134 secured on the exterior surface 112 of the containers 102. The label 134 can be utilized by a user to identify the contents of the container 102. The label 134 can be removable and reapplied if the contents of the container 102 are changed. Further, a label 134 is not needed and a user can write directly on the exterior surface 112 of the container 102 with a dry erase or permanent marker, depending on the wants and needs of a user.

FIGS. 2A and 2B illustrate the laundry caddy device 100 with one of the containers 102 removed and with the measuring cup 126 removed. As stated supra, the laundry caddy device 100 comprises a dispensing component 106 removably secured to the top end 108 of each of the containers 102. Specifically, the dispensing component 106 is secured over the opening 118 to prevent spilling of the laundry solvent from within the cavity 116, and the dispensing component 106 used depends on the type of laundry solvent contained within the cavity 116. For example, if a dry laundry solvent is poured into a container 102, then a measuring cup 126 is typically used. The measuring cup 126 would be inverted and secured to the top end 108 of the container, securing the contents of the containers 102. A user would then remove the measuring cup 126 and pour the desired amount of laundry solvent from the container 102 into the measuring cup 126.

Figure 3:
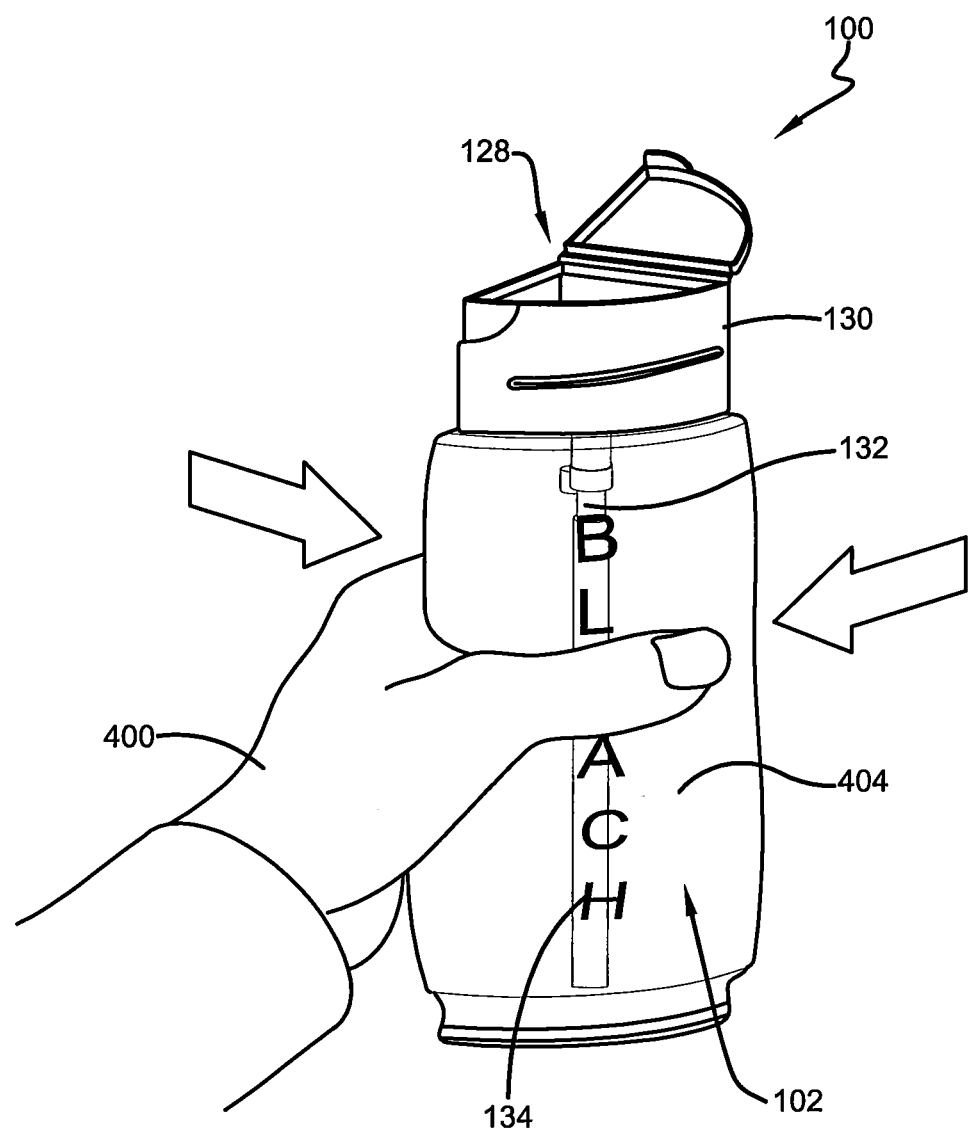
FIG. 3 illustrates a perspective view of the laundry caddy device with the pour spout and vacuum tube in accordance with the disclosed architecture.

FIG. 3 illustrates the laundry caddy device 100 with the pour spout 128 and vacuum tube 132. As stated supra, if liquid laundry solvent is poured into a container 102, then a pour spout 128, a retaining cup 130, and a vacuum tube 132 in fluid communication with the retaining cup 130 is typically used for dispensing the contents of the container 102. The vacuum tube 132 would be inserted into the cavity 116 and would protrude up into the retaining cup 130, such that a user 400 would squeeze the container 102 to draw a desired amount of laundry solvent 404 up through the vacuum tube 132 and into the retaining cup 130. Once the desired amount of laundry solvent 404 is drawn up into the retaining cup 130, the user 400 can then release the container 102 and pour the laundry solvent 404 out of the retaining cup 130 via the pour spout 128 without pouring the rest of the laundry solvent 404 remaining in the cavity 116.

Figure 4:
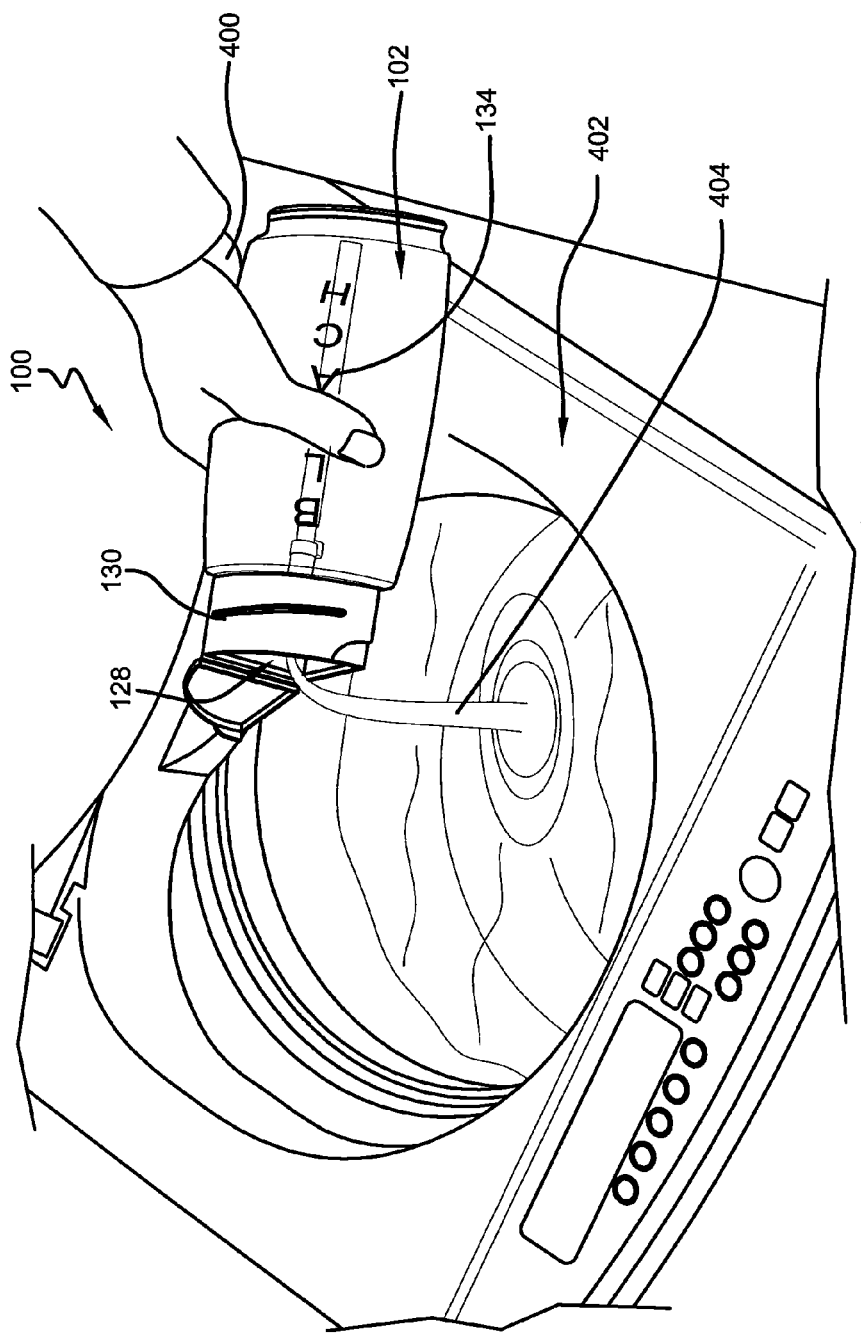
FIG. 4 illustrates a perspective view of the laundry caddy in use in accordance with the disclosed architecture.
Figure 5:
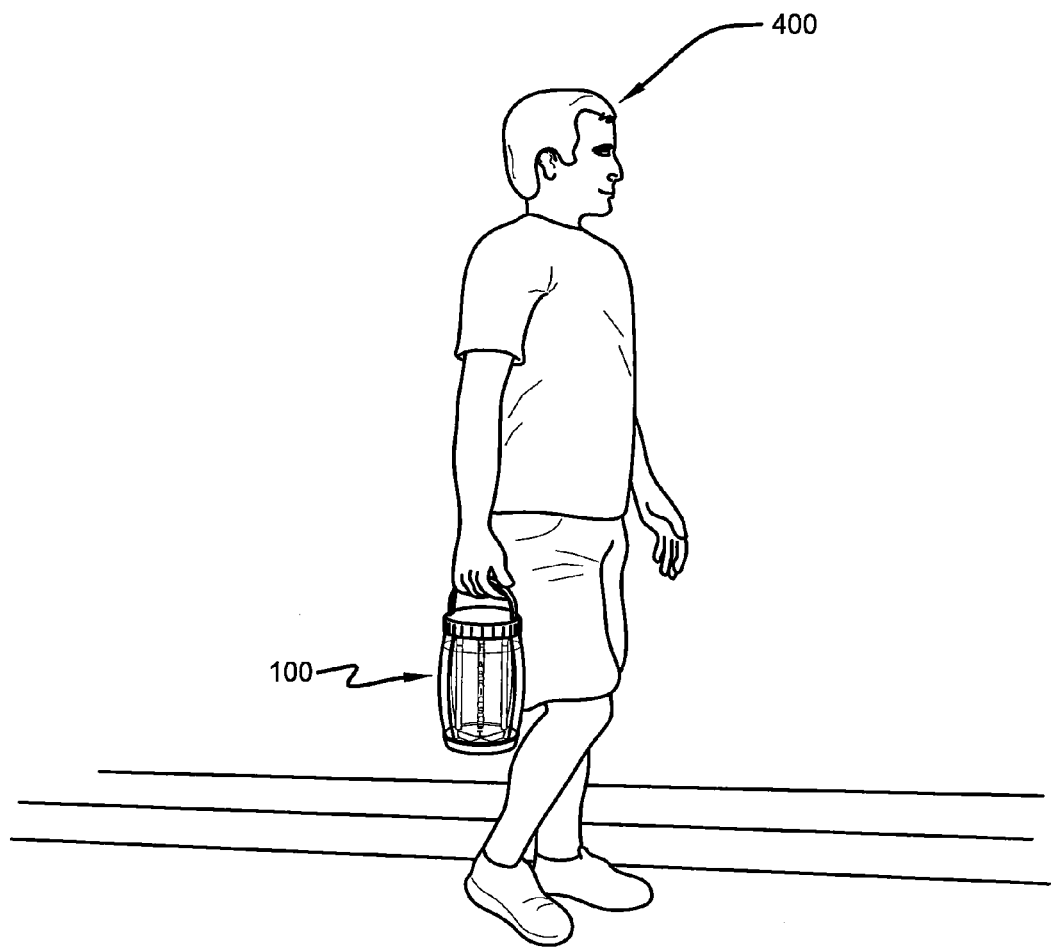
FIG. 5 illustrates a perspective view of the laundry caddy in use in accordance with the disclosed architecture.

FIGS. 4-5 illustrate the laundry caddy device 100 in use, wherein a user 400 is pouring laundry solvent from a container 102 into a washing machine 402 (shown in FIG. 4) and wherein a user 400 is transporting the laundry caddy device 100 (shown in FIG. 5). In operation, a user 400 would choose a plurality of containers 102 to interlock together to form the laundry caddy device 100. The user 400 would then fill up each of the containers 102 with the specific laundry solvent 404 they choose, each container 102 can be filled with a different laundry solvent 404. Typically, the user 400 would then snap on a dispensing component 106 over the top end 108 of each container 102. The dispensing component 106 can be any suitable dispensing means as is known in the art, such as pour spouts, vacuum tubes, measuring cups, etc., and each container 102 can have a different dispensing component 106 depending on the type of laundry solvent 404 contained within the cavity 116.

For example, if the user 400 fills a container 102 with dry laundry solvents, a measuring cup 126 is typically used. The measuring cup 126 would be inverted and secured to the top end 108 of the container, securing the contents of the container 102. The user 400 would then remove the measuring cup 126 and pour the desired amount of laundry solvent 404 from the container 102 into the measuring cup 126.

Additionally if the user 400 fills a container 102 with liquid laundry solvents, a pour spout 128, a retaining cup 130, and a vacuum tube 132 in fluid communication with the retaining cup 130 is typically used. The vacuum tube 132 would be inserted into the cavity 116 and would extend up into the retaining cup 130, such that the user 400 would squeeze the container 102 to draw a desired amount of laundry solvent 404 up through the vacuum tube 132 and into the retaining cup 130. Once the desired amount of laundry solvent 404 is drawn up into the retaining cup 130, the user 400 can then release the container 102 and pour the laundry solvent 404 out of the retaining cup 130 via the pour spout 128 without dispensing the remaining laundry solvent in the cavity 116 (as shown in FIG. 4).

After use, the containers 102 can be returned to the base component 104 and inter-locked together to form a single component. The user 400 would insert each container 102 into the base component 104, snapping it in place via the snap feature. Typically, the containers 102 are each a generally triangular prism in shape with slightly radiused exterior surfaces. The containers 102 are inter-locked together such that the vertex opposite the radius of each container 102, contacts each other to form a generally cylindrical structure. Once the containers 102 are secured in the base component 104, the user 400 can then insert the lid 122, snapping it over the top end of the cylindrical structure to further secure the containers 102 together. The lid 122 further comprises a handle 124 and the user 400 can then easily transport the laundry caddy device 100 via the handle 124 (as shown in FIG. 5).

What has been described above includes examples of the claimed subject matter. It is, of course, not possible to describe every conceivable combination of components or methodologies for purposes of describing the claimed subject matter, but one of ordinary skill in the art may recognize that many further combinations and permutations of the claimed subject matter are possible. Accordingly, the claimed subject matter is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A laundry caddy device, comprising:
a plurality of containers, each comprising a top end, a bottom end, an exterior surface, an interior surface, and an interior cavity formed therein, and wherein the plurality of containers are each shaped as a triangular prism with radiused exterior surfaces;
wherein the plurality of containers are inter-locked together such that a vertex opposite a radius of each container contacts each adjacent container to form a cylindrical structure;
a base component removably secured to a bottom perimeter of the cylindrical structure; and
a dispensing component removably secured to the top end of at least one of the plurality of containers; and
wherein at least one of the plurality of containers retains a predetermined amount of laundry solvent within the interior cavity.

2. The laundry caddy device of claim 1, further comprising a lid removably secured to a top end of the cylindrical structure.

3. The laundry caddy device of claim 2, wherein the lid comprises a handle.

4. The laundry caddy device of claim 1, wherein the dispensing component comprises a measuring cup.

5. The laundry caddy device of claim 1, wherein the dispensing component comprises a pour spout, a retaining cup, and a vacuum tube in fluid communication with the retaining cup, such that a user squeezes at least one of the plurality of containers to dispense a desired amount of laundry solvent up through the vacuum tube and into the retaining cup.

6. The laundry caddy device of claim 1, wherein at least one of the plurality of containers comprises a label secured on the exterior surface.

7. A laundry caddy device, comprising:
a plurality of containers each comprising a top end, a bottom end, an exterior surface, an interior surface, and an interior cavity formed therein, and wherein the plurality of containers are each shaped as a triangular prism with radiused exterior surfaces;

wherein the plurality of containers are inter-locked together such that a vertex opposite a radius of each container contacts each adjacent container to form a cylindrical structure;
a base component removably secured to a bottom perimeter of the cylindrical structure via a snap feature; and
a dispensing component removably secured to the top end of at least one of the plurality of containers.

8. The laundry caddy device of claim 7, wherein the dispensing component comprises a measuring cup.

9. The laundry caddy device of claim 7, wherein the dispensing component comprises a pour spout, a retaining cup, and a vacuum tube in fluid communication with the retaining cup, such that a user squeezes at least one of the plurality of containers to dispense a desired amount of laundry solvent up through the vacuum tube and into the retaining cup.

10. The laundry caddy device of claim 7, further comprising a lid removably secured to a top end of the cylindrical structure.

11. The laundry caddy device of claim 10, wherein the lid comprises a handle.

12. The laundry caddy device of claim 7, wherein at least one of the plurality of containers comprises a label secured on the exterior surface.

13. A laundry caddy device, comprising:
four containers each comprising a top end, a bottom end, an exterior surface, an interior surface, and an interior cavity formed therein, and wherein the four containers are each shaped as a triangular prism with radiused exterior surfaces;
wherein the four containers are inter-locked together such that a vertex opposite a radius of each container contacts each adjacent container to form a cylindrical structure;
a base component removably secured to a bottom perimeter of the cylindrical structure via a snap feature;
a dispensing component removably secured to each top end of the four containers; and
a lid removably secured to a top end of the cylindrical structure.

14. The laundry caddy device of claim 13, wherein the lid comprises a handle.

15. The laundry caddy device of claim 13, wherein the dispensing component comprises a measuring cup.

16. The laundry caddy device of claim 13, wherein the dispensing component comprises a pour spout, a retaining cup, and a vacuum tube in fluid communication with the retaining cup, such that a user squeezes at least one of the four containers to dispense a desired amount of laundry solvent up through the vacuum tube and into the retaining cup.

17. The laundry caddy device of claim 13, wherein at least one of the four containers comprises a label secured on the exterior surface.

* * * * *